Patented Jan. 23, 1923.

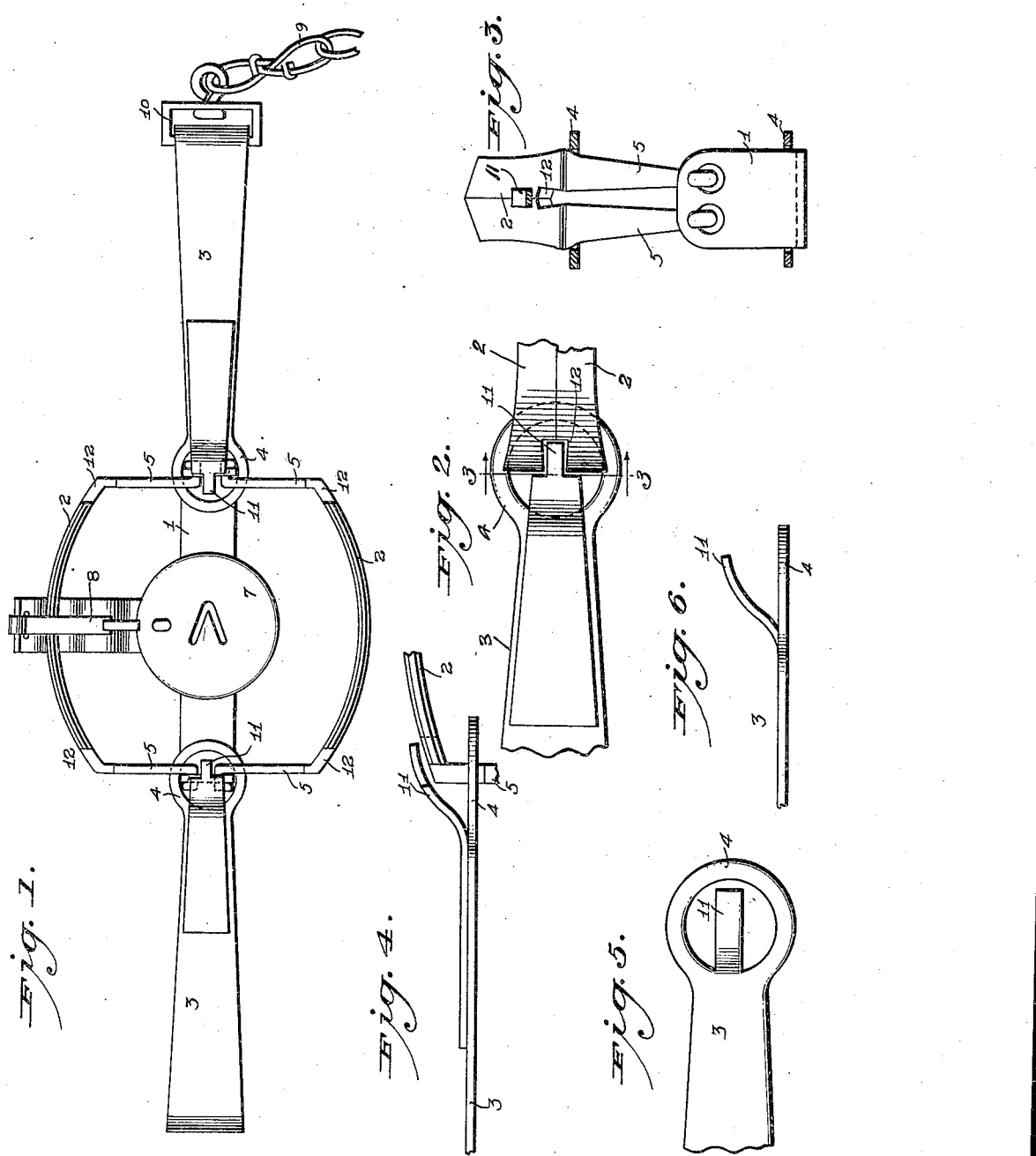

1,443,309

UNITED STATES PATENT OFFICE.

SQUIRE B. CONNER, OF TOPPENISH, WASHINGTON.

TRAP.

Application filed January 11, 1921. Serial No. 436,535.

*To all whom it may concern:*

Be it known that I, SQUIRE B. CONNER, a citizen of the United States, and a resident of Toppenish, in the county of Yakima and State of Washington, have invented a new and improved Trap, of which the following is a full, clear, and exact description.

This invention relates to improvements in animal traps, particularly to that form of trap which is normally concealed in leaves in an animal runway, and which operates to catch the foot of an animal stepping thereon.

One of the principal difficulties ordinarily experienced in the use of this trap is that the leaves, twigs, stones, etc., which normally conceal the trap serve to block the movement of the jaws when the trap is sprung, very often allowing animals to escape.

The principal object of this invention is to provide a trap in which the rubbish is automatically thrown from between the jaws as the trap is sprung.

A further object is to provide an ejector device of this character which automatically clears the path of the jaws and which is operatively connected to the jaw actuating means so that the jaws and the ejector are operated simultaneously.

A further object is to provide a trap having the characteristics above noted which will be strong and durable in use, simple and practical in construction, and comparatively inexpensive to manufacture.

With these and other objects in view the invention consists in certain novel features of construction, and combinations and arrangements of parts, as will be more fully hereinafter described and pointed out in the claims.

In the accompanying drawings—

Figure 1 is a top plan view illustrating my improved trap in set position.

Figure 2 is an enlarged fragmentary top plan view illustrating the details of the ejector mechanism.

Figure 3 is a view in section on the line 3—3 of Fig. 2.

Figure 4 is an edge view of Fig. 2.

Figures 5 and 6 are enlarged fragmentary detail views illustrating a slightly modified form of ejector.

Referring in detail to the drawings, 1 represents the base of a trap, 2, 2 a pair of substantially U-shaped jaws hinged at their extremities to the base and normally held in closed position by bow springs 3, 3. At each end the bow springs terminate in loops 4, one loop of each spring being secured to the base 1 and the other loop encircling the arms 5 of the jaws 2 and normally retaining them in closed position as indicated clearly in Figure 3.

In order to separate the jaws 2 it is necessary to force the upper arms of the springs downwardly so that the upper loops 4 will allow a pivotal movement of the jaws.

Any conventional form of trigger mechanism such as the hinged trip plate 7 and the pivoted latch 8 may be employed to lock the parts in the set position illustrated in Figure 1. An anchor chain 9 is attached to a collar 10 encircling one of the jaw actuating bow springs 3. The mechanism above described forms part of a trap which is in common use. My invention resides more particularly in the provision of ejecting fingers 11 which will automatically clear the path of the jaws when the trap is sprung.

One of these ejector fingers is carried by the upper arm of each bow spring 3. The fingers curve upwardly from the arms and extend over the center of the upper loops 4. They may constitute either separate members brazed or otherwise secured to the arms of the springs as shown in Figures 1, 2 and 4, or they may form an integral part of the arms as suggested in Figures 5 and 6.

At the juncture of the intermediate portion of the jaws with the arms 5 thereof, the jaws are formed with recesses 12 so that clearance is provided for the upward movement of the fingers when the trap is sprung.

It is to be understood that the particular form of trap shown is merely illustrative of the use to which the ejector finger is put and that the finger may be applied to various other traps besides the one illustrated.

Various slight changes might be made in the general form and arrangement of the parts described without departing from the invention, and hence I do not limit myself to the precise details set forth but consider myself at liberty to make such changes and modifications as fairly fall within the spirit and scope of the appended claims.

I claim:

1. The combination, in an animal trap, of hinged jaw members, spring means for closing the same, and obstruction removing means carried by such spring means being attached thereto outside of the jaws and having an element proportioned to extend between the jaws near their hinges when opened and to stand clear of and above them when closed by the spring.

2. The combination, in an animal trap, of hinged jaw members, spring means for closing the same, and obstruction removing means carried by such spring means and consisting of an element having a free end adapted to rise between and clear of the jaw members during their closing movement.

3. In an animal trap, the combination with U-shaped pivoted jaws, springs having loops encircling the arms of the jaws, and a trigger mechanism for said jaws, of ejector fingers each secured at one end to a spring, and having its free end extending between the arms of the jaws when the trap is set and movable out of the path of the jaws when the trap is sprung.

4. An animal trap comprising U-shaped pivoted jaws having their arms recessed on their inner sides, springs having loops encircling the arms of the jaws, a trigger mechanism for the jaws, and ejector fingers secured at one end to the springs and having their free ends curved upwardly and reduced, the reduced ends extending into the space formed by the recesses of the arms of the jaws when the trap is set and movable out of the path of the said arms when the trap is sprung.

SQUIRE B. CONNER.